July 28, 1959     T. B. DALTON     2,896,967

SUPPORT AND JACK FOR SEMI-TRAILERS

Filed March 27, 1953     2 Sheets-Sheet 1

INVENTOR.
THOMAS B. DALTON
BY
*Barnes, Kisselle, Laughlin & Raisch*
ATTORNEYS.

July 28, 1959
T. B. DALTON
2,896,967
SUPPORT AND JACK FOR SEMI-TRAILERS
Filed March 27, 1953
2 Sheets-Sheet 2
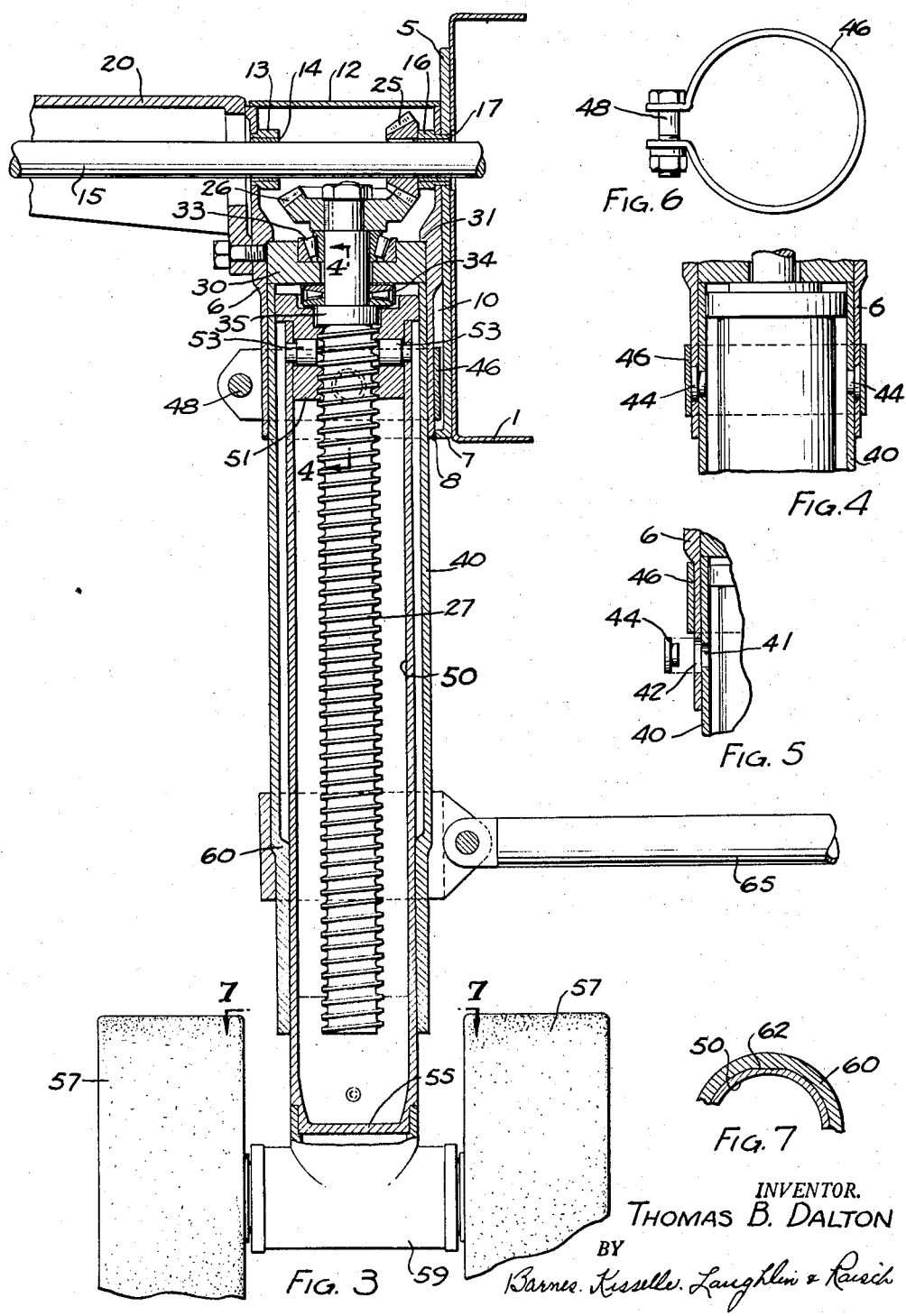
INVENTOR.
THOMAS B. DALTON
BY
Barnes, Kisselle, Laughlin & Raisch
ATTORNEYS.

United States Patent Office 2,896,967
Patented July 28, 1959

2,896,967

SUPPORT AND JACK FOR SEMI-TRAILERS

Thomas B. Dalton, Muskegon, Mich., assignor to West Michigan Steel Foundry Co., Muskegon, Mich., a corporation of Michigan Application March 27, 1953, Serial No. 345,213

3 Claims. (Cl. 280—150.5)

This invention relates to a structure for supporting the forward end of semi-trailers.

As is well known to those versed in the art, a semi-trailer is a vehicle with ground engaging wheels at its rear end, and its forward end rests upon a tractor through the means of a form of fifth wheel. The tractor may be uncoupled from the semi-trailer during periods when the semi-trailer is being loaded or unloaded or stored, and the semi-trailer is usually equipped with a support capable of being projected or extended, to support the forward end when the semi-trailer is detached from the tractor, and capable of being retracted for operation with the tractor.

The invention aims to provide an improved support structure which will materially simplify, not only original assembly, but removal of the major portion of the supporting structure for repair, replacement or for other purposes, and for reassembly. It is also the aim of the invention to provide an improved structure which facilitates manufacture thereof and which has added strength and reduced weight. In connection with the matter of manufacturing the structure, machine operations required are reduced and a support structure is provided which is operable with increased efficiency.

A support structure constructed in accordance with the invention is disclosed in the accompanying drawings:

Fig. 3 is an enlarged view mostly in section illustrating structural features of the supporting leg.

Fig. 4 is a sectional view taken on line 4—4 of Fig. 3 showing features of construction.

Fig. 5 is a sectional view similar to Fig. 4 showing one of the holding elements removed.

Fig. 6 is a view of clamping band or collar.

Fig. 7 is a sectional view taken substantially on line 7—7 of Fig. 3 illustrating structure for providing a non-rotatable slidable connection between supporting leg elements.

Figure 1:
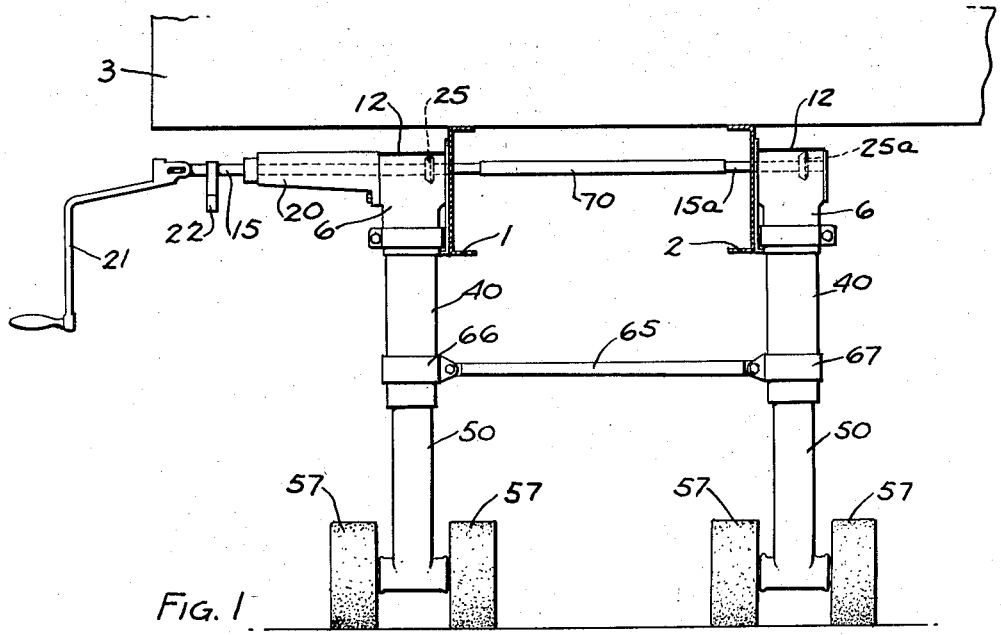
Fig. 1 is a general view illustrating two legs of the supporting structure showing the same as mounted on the frame and supporting the frame of a semi-trailer.

The opposite frame elements of a vehicle, such as a semi-trailer, are illustrated at 1 and 2 in Fig. 1 and the body of the vehicle is illustrated at 3. One supporting leg is attached to each frame element. Since the supporting legs are identical in construction, it will suffice to describe one of them. There is a flange plate 5 constructed to be bolted, riveted or otherwise secured to the frame 1, and a housing 6 is secured to the flange plate as by means of welding. The flange plate 5 has an inturned lower edge 7 which may be welded to the lower edge of the housing 6 as at 8 so that the flange plate and housing are spaced from each other for a portion of their vertical distance thus leaving a clearance space 10. The housing is provided with a suitable cover 12.

Mounted in the housing is a bushing 13 preferably provided with a bearing 14 for receiving an operating shaft 15. A similar bushing 16, with a bearing, is provided in the housing and flange plate so that the operating shaft 15 may extend therethrough and through an opening 17 in the frame.

The outer end of the shaft 15 is supported by a bracket 20 bolted to the housing and the projecting end of the operating shaft is provided with an operating handle 21 shown as extended in operating position in Fig. 1, but which can be folded relative to the shaft and engaged in a retainer or hook 22.

Mounted on the shaft 15 is a gear 25, the teeth of which mesh with the gear 26, keyed to the upper end of a screw 27. Within the housing is a bearing plate 30 which seats against a shoulder 31 on the inside of the housing and the screw shaft is journaled by a bearing 33 shown herein as in the form of a tapered roller bearing. A thrust bearing 34 is positioned under the bearing plate 30 and the screw shaft has a flange portion 35 for thrusting against the thrust bearing. The thrust bearing is shown as a form of roller bearing.

The housing 6 is arranged to receive a tubular fixed or upper leg section 40. This leg section is secured in position in the housing in a strong manner, but in a manner which permits of ease of assembly and disassembly. As shown in Figs. 4 and 5, the upper leg section 40 is provided with an aperture 41 and the housing is provided with a cooperating aperture 42. Each member may be provided with two of such apertures although more may be used, if necessary or desirable. Locking pins or plugs 44 are inserted in the aligned apertures. It will be noted that the aperture 41 is smaller than the aperture 42 and that the pin 44 has two diameters to thus fit into the opening defined by the two aligned apertures. Thus the pins 44 are self-locating, so to speak, and cannot be pushed through the apertures.

A collar 46 or band, is disposed around the housing and may be clamped to the housing by means of a bolt 48. When the collar is located, as shown in Fig. 1 and in Fig. 4, so that it overlies the pins 44, it is to be clamped in position to thus securely hold the pins in position thereby locking the leg section 40 to the housing. It will be noted that a collar extends through the clearance 10 and when it is loosened it may be shifted to the position shown in Fig. 5 for removal of or insertion of the pins. The leg section 40 extends to the underside of bearing plate 30 and thus holds the bearing plate positioned.

Slidably and non-rotatably mounted in the upper leg section 40 is a tubular lower leg section 50. The upper end of the leg section 50 carries a nut 51 secured thereto by pins 53, the nut being internally threaded with its threads in engagement with the threads on the screw shaft 27. The lower end of the projectable leg section 50 is closed as at 55 so that it may retain a quantity of oil, the level of which may be about that as shown in Fig. 3. Secured to the lower end of the projectable leg section 50 is a suitable ground engaging means shown herein as embodying rollers or wheels 57 mounted on an axle 58 which extends through an axle housing 59.

The lower end of the fixed leg section 40 is formed with an interior diameter so as to slidably fit and receive the projectable leg section 50. Preferably the lower end of the fixed leg section 40 has a thickened wall as shown at 60. The internal surface of this portion of the upper leg section is provided with an axially extending flat surface, as shown in Fig. 7, and the outside surface of the projectable leg section 50 is formed with a similar flat surface and these surfaces interfit as at 62 to provide for a slidable but non-rotatable interfit. By this expedient, machine operations are eliminated which would otherwise be necessary in the formation of a key and keyway. One or more cooperating flat surfaces may be provided on the members although one on each member is sufficient to provide the non-rotating interfit.

Figure 2:
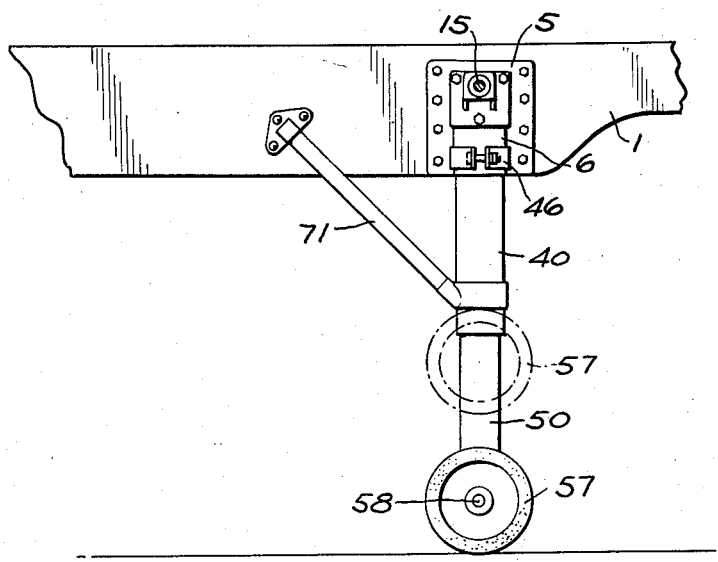
Fig. 2 is a side elevational view showing the operating shaft in section.

As shown in Fig. 1, and as above described, two identical supporting legs may be used on the trailer and the same reference characters are applied to the identical parts in Fig. 1. The two legs may be interconnected by a cross brace 65 connected at opposite ends to the lower portions of the leg sections 40 as at 66 and 67, and the shaft 15 connects to a shaft 15a through the means of a connector element 70, and on the shaft 15a is a gear 25a for operating the screw in its supporting leg. The gear 25a is reversed in position with respect to gear 25 as the entire leg is reversed in position. Each leg may be additionally supported to the trailer frame as by means of an angular support 71, as shown in Fig. 2.

An advantageous manner of forming both leg sections 40 and 50 and the housing 6 is that of extruding the same or forming the same from a billet of steel or other suitable material which is forced into and through a die. Of course, the inner leg section 50 is formed so that it is closed at one end to retain the oil.

In considering the operation of the structure, it will be appreciated that as shown in Fig. 3, the projectable leg section is retracted. This is the normal operating position; that is, the normal position when the tractor and semi-trailer are in operation as a unit. When the tractor and semi-trailer are to be separated the operating shaft 15 is rotated to thus turn the screw shaft and project the inner leg section 50 downwardly. The projectable leg sections are shown projected in Fig. 1 and are in a normal position for supporting the frame of the vehicle with the wheels 57 in engagement with the ground. When in the position shown in Fig. 1 the trailer frame may be elevated or lowered by turning the shaft 15.

The supporting legs may be removed from the housings which are relatively permanently secured to the trailer frame should it be desirable to make a change to a shorter or longer leg structure, and should it be desirable or necessary to remove the supporting legs for repair work or to otherwise replace them. This is done by loosening the collar 46 elevating it to the position shown in Fig. 5 so that the pins 44 may be removed. Then the leg sections 40 may be pulled or dropped from the housings 6 together with the projectable leg member 50, its nut, the screw shaft, the bearing plate 30 and gear 26. The repaired leg structure or replaced leg structures may be reassembled by a reversal of this process. This assembly may be made with great facility and, of course, initial installation may be made with equal facility.

I claim:

1. In a support structure for a semi-trailer having a structural member, a housing adapted to be secured to the structural member and having a downwardly extending part, a supporting leg having its upper end portion interfittingly disposed with respect to said part of said housing, the housing and supporting leg having substantially aligned openings therein the inner one of which is relatively small and the outer one of which is relatively large, a locking pin having a portion wtih a relatively large diameter and a portion with a relatively small diameter and a generally radial intermediate shoulder, said locking pin being disposed in said apertures, said shoulder engaging an outwardly disposed surface of the inner of the interfitting parts to position said large diameter and small diameter portions thereof respectively in said large and small openings, said locking pin securing the supporting leg to the housing fixedly, and a contractable band tightened in position around the outer of the interfitting parts and overlying the outside face of the locking pin, said band engaging said outer interfitting part with force adequate to remain frictionally secured in said position, said force being inadequate to distort significantly either of said interfitting parts, said band being expansible to facilitate removal of said locking pin and detachment of said supporting leg from said housing.

2. The combination defined in claim 1 wherein said large and small diameter portions of said locking pin are generally cylindrical and said shoulder extends generally at right angles to said portions.

3. The combination defined in claim 1 wherein said openings in said interfitting parts are round, said large and small diameter portions of said locking pin having round shapes complementary to said openings.

References Cited in the file of this patent

UNITED STATES PATENTS

| | | |
|---|---|---|
| 461,643 | Robie | Oct. 20, 1891 |
| 573,695 | Penfield | Dec. 22, 1896 |
| 815,968 | Lynch | Mar. 27, 1906 |
| 1,346,341 | Schinkez | July 13, 1920 |
| 1,524,083 | Clement | Jan. 27, 1925 |
| 2,075,926 | Barr | Apr. 6, 1937 |
| 2,143,181 | Barr | Jan. 10, 1939 |
| 2,189,644 | Wingard | Feb. 6, 1940 |
| 2,205,436 | Richards | June 25, 1940 |
| 2,291,253 | Osborn | July 28, 1942 |
| 2,291,593 | Hubbard | July 28, 1942 |
| 2,347,921 | Miller | May 2, 1944 |
| 2,446,517 | Black | Aug. 10, 1948 |
| 2,458,312 | Stephen | Jan. 4, 1949 |
| 2,490,369 | Neuwirth | Dec. 6, 1949 |
| 2,523,152 | Seyferth | Sept. 19, 1950 |